(12) United States Patent
Cook et al.

(10) Patent No.: US 8,759,735 B2
(45) Date of Patent: Jun. 24, 2014

(54) MULTI-FUNCTION AIRBORNE SENSOR SYSTEM

(75) Inventors: Lacy G. Cook, El Segundo, CA (US); Bryce A. Wheeler, Mammoth Lakes, CA (US)

(73) Assignee: Raytheon Company, Waltham, MA (US)

( * ) Notice: Subject to any disclaimer, the term of this patent is extended or adjusted under 35 U.S.C. 154(b) by 320 days.

(21) Appl. No.: 13/111,605

(22) Filed: May 19, 2011

(65) Prior Publication Data

US 2012/0292482 A1 Nov. 22, 2012

(51) Int. Cl.
*G02B 7/182* (2006.01)
(52) U.S. Cl.
USPC .......................... 250/206.1; 250/216; 359/850
(58) Field of Classification Search
USPC ................ 250/206.1, 216; 359/839, 846, 850
See application file for complete search history.

(56) References Cited

U.S. PATENT DOCUMENTS

| | | | |
|---|---|---|---|
| 3,420,594 A | * | 1/1969 | Chapman ...................... 359/401 |
| 4,097,155 A | * | 6/1978 | Appert ....................... 356/141.5 |
| 4,886,330 A | | 12/1989 | Linick |
| 5,483,865 A | | 1/1996 | Brunand |
| 2004/0041108 A1 | | 3/2004 | Shaffer et al. |

FOREIGN PATENT DOCUMENTS

| | | |
|---|---|---|
| DE | 4440444 C1 | 11/1995 |
| GB | 2279762 B | 6/1995 |

OTHER PUBLICATIONS

Hintz, R. T., et al, "UAV Infrared Search and Track (ORST)/Eyesafe Laser Range Finder (ELR) System", Emerging EO Phenomenology, Meeting Proceedings RTO-MP-SET-094, Oct. 1, 2005.
Maltese, Dominique et al, "New Generation of Naval IRST: Example of EOMS NG", Proceedings of SPIE, Jan. 1, 2010.
Nougues, Pierre-Olivier et al, "Third-Generation Naval IRST Using the Step-and-Stare Architecture", Proceedings of SPIE, vol. 6940, Jan. 1, 2008.

* cited by examiner

*Primary Examiner* — Tony Ko
(74) *Attorney, Agent, or Firm* — Lando & Anastasi, LLP

(57) ABSTRACT

Various embodiments provide a sensor system including a first optical sub-system having a first plurality of optical elements, and a second optical sub-system having a second plurality of optical elements including a first mirror. The second optical sub-system is configured to rotate about a first axis relative to the first optical sub-system and the first mirror is configured to rotate about a second axis substantially perpendicular to the first axis. The first axis and the second axis are arranged so as not to intersect each other so as to maximize a field of regard of the sensor system.

36 Claims, 5 Drawing Sheets

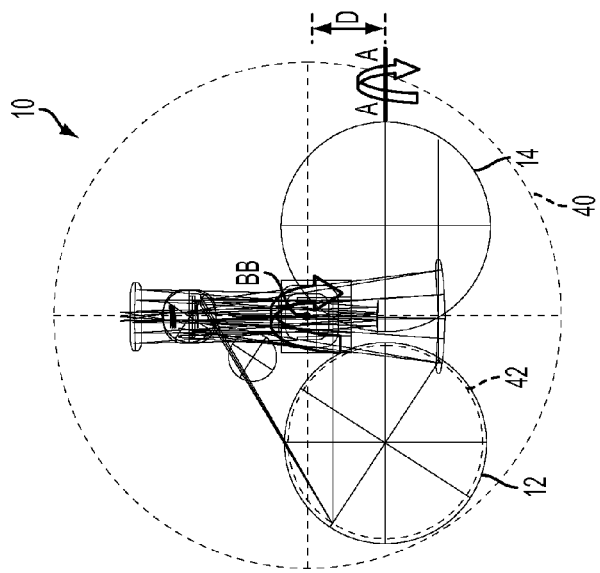
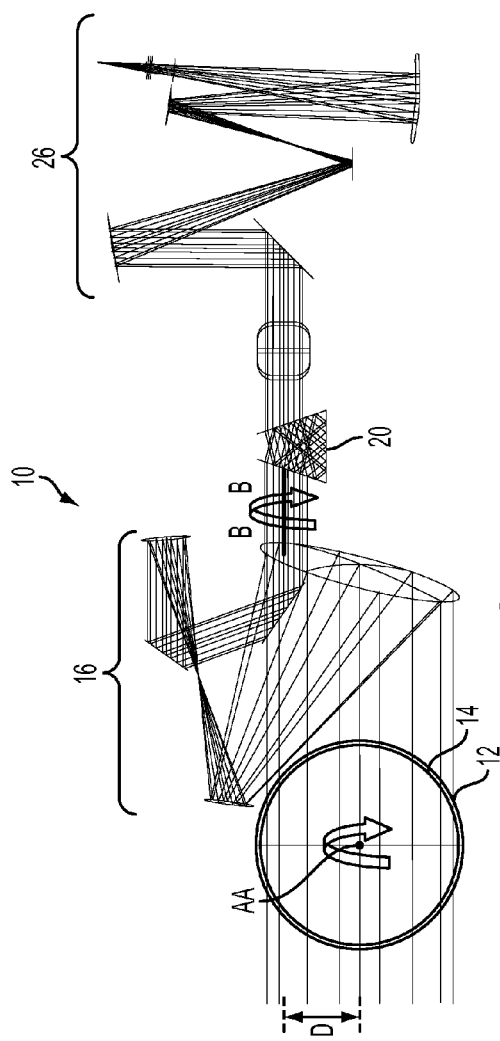
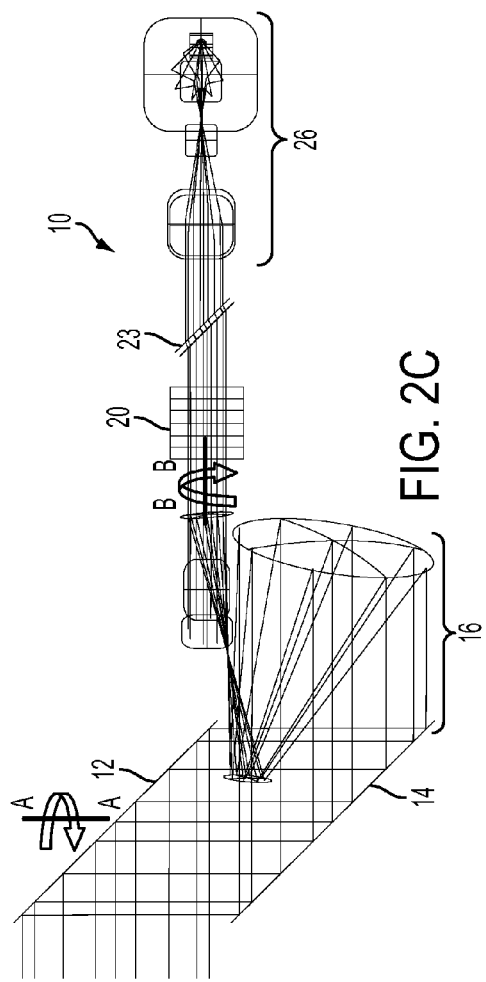
FIG. 2A
FIG. 2C
FIG. 2B

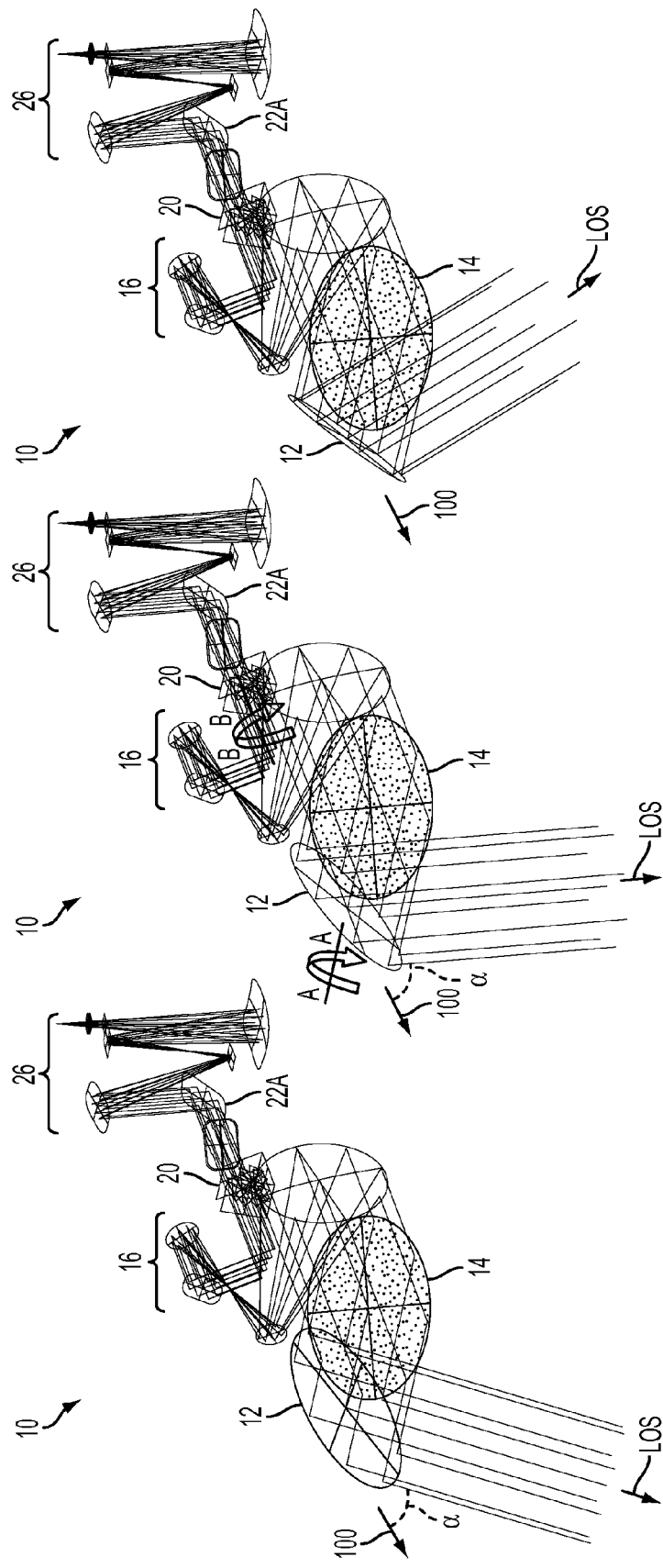

MULTI-FUNCTION AIRBORNE SENSOR SYSTEM

BACKGROUND

This disclosure pertains to optical sensor systems in general and in particular to a multi-function airborne sensor system combining infrared search and track (IRST), targeting, and standoff reconnaissance functions in the same airborne sensor system.

Demand for imaging sensors that provide infrared search and track (IRST), targeting or standoff reconnaissance functions is increasing. These type of sensors can be used in various applications such as on an aircraft including an unmanned aerial vehicle (UAV) platform for standoff reconnaissance or on a jet aircraft for IRST, targeting and standoff reconnaissance.

IRST is often used for detecting and tracking objects which emit infrared radiation such as jet aircrafts, helicopters, etc. Generally, IRST systems are passive in that they do not transmit or send any radiation of their own unlike radar or Light Detection and Ranging (LIDAR) or Laser Detection and Ranging (LADAR). However, some IRST systems can incorporate laser rangefinders to provide information on an object's position. IRST system are currently used in many aircrafts, particularly, fighter aircrafts to provide air superiority. As its name indicates, an IRST system operates generally in the infrared wavelength range, but visible wavelength sensing capability is typically also desired within the IRST sensor.

Stand-off reconnaissance also known as "scouting" is used for survey or observation to gain or collect image information which can be used for intelligence gathering. The wavelength ranges of interest for standoff reconnaissance include the visible wavelength range between about 0.4 μm and about 0.7 μm, near-infrared wavelength range between about 0.7 μm and about 1 μm, the short wavelength infrared radiation (SWIR) in the wavelength range between approximately 1 μm and 3 μm, mid wavelength infrared radiation (MWIR) in the wavelength range between approximately 3 μm and 5 μm, and long wavelength infrared radiation (LWIR) in the wavelength range between approximately 8 μm and 12 μm.

Targeting, on the other hand, is used for target location and designation, for example, in fighter aircrafts and bombers for identifying targets and guiding precision guided munitions such as laser-guided bombs or missiles to designated targets. Some targeting systems have a laser (e.g., an infrared laser) that can designate a target for laser-guided munitions, enabling an aircraft carrying a targeting system to designate its own targets or designate targets for other friendly units. An additional active laser function that may also be implemented in a targeting sensor is laser rangefinding.

Currently, each of the IRST function, standoff reconnaissance function and targeting function is provided as a separate sensor system. Therefore, a user desiring to utilize two or more of these functions is required to purchase two or more separate sensor systems which can increase the overall cost of owning such separate sensor systems. In addition to the cost, providing two or more of such separate sensor system on a user platform increases the overall complexity. This separation of the three sensing functions into three separate sensor systems has generally been motivated by, among other things, the significantly different fields of regard required for each sensing function: a) the IRST field of regard is very wide in azimuth (horizontal), but generally forward looking, b) the standoff reconnaissance field of regard is wide in pitch (horizontal), but generally side looking, and c) the targeting field of regard is very wide in elevation, and can extend from many degrees above the local horizon (forward) to many degrees past (behind) the local nadir (vertical) by as much as 60 deg.

In addition, none of these three separate sensor systems currently has the capability to incorporate advanced coherent LADAR subsystems such as long range vibrometry. Prior attempts to add advanced LADAR capability to any of the IRST sensor system, standoff reconnaissance sensor system and targeting system has met with limited success due to the fact that adding such advanced LADAR capability compromises some of the original sensor (IRST, targeting, or standoff reconnaissance) capabilities. Furthermore, the stability requirements that are needed for such an advanced LADAR function are not characteristic of existing sensor approaches for IRST, targeting, or stand-off reconnaissance functions.

Hence, there is a need in the art for a multi-function airborne sensor system that is able to combine infrared search and track (IRST), targeting and standoff reconnaissance functions on the same airborne system. There is also a need for a system that further provides advanced coherent LADAR function.

SUMMARY

One or more embodiments of the present disclosure provide a sensor system including a first optical sub-system having a first plurality of optical elements, and a second optical sub-system having a second plurality of optical elements including a first mirror. The second optical sub-system is configured to rotate about a first axis relative to the first optical sub-system and the first mirror is configured to rotate about a second axis substantially perpendicular to the first axis. The sensor system further includes a window. The first axis and the second axis are arranged so as not to intersect each other so as to reduce a size of the window while maximizing a field of regard of the sensor system.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

BRIEF DESCRIPTION OF THE DRAWINGS

In the accompanying drawings:

FIGS. 2A-2C depict a lateral view, a front view and a bottom view, respectively, of a raytrace of sensor system depicted in FIG. 1, according to one embodiment;

FIGS. 3A-3C show a ray trace of the sensor system where a coelostat mirror is rotated around rotation axis AA to produce a wide field of regard travel in the elevation direction to locate, track or identify a scene or an object in the elevation direction, as desired in a targeting mode, according to one embodiment;

DETAILED DESCRIPTION

Figure 1:
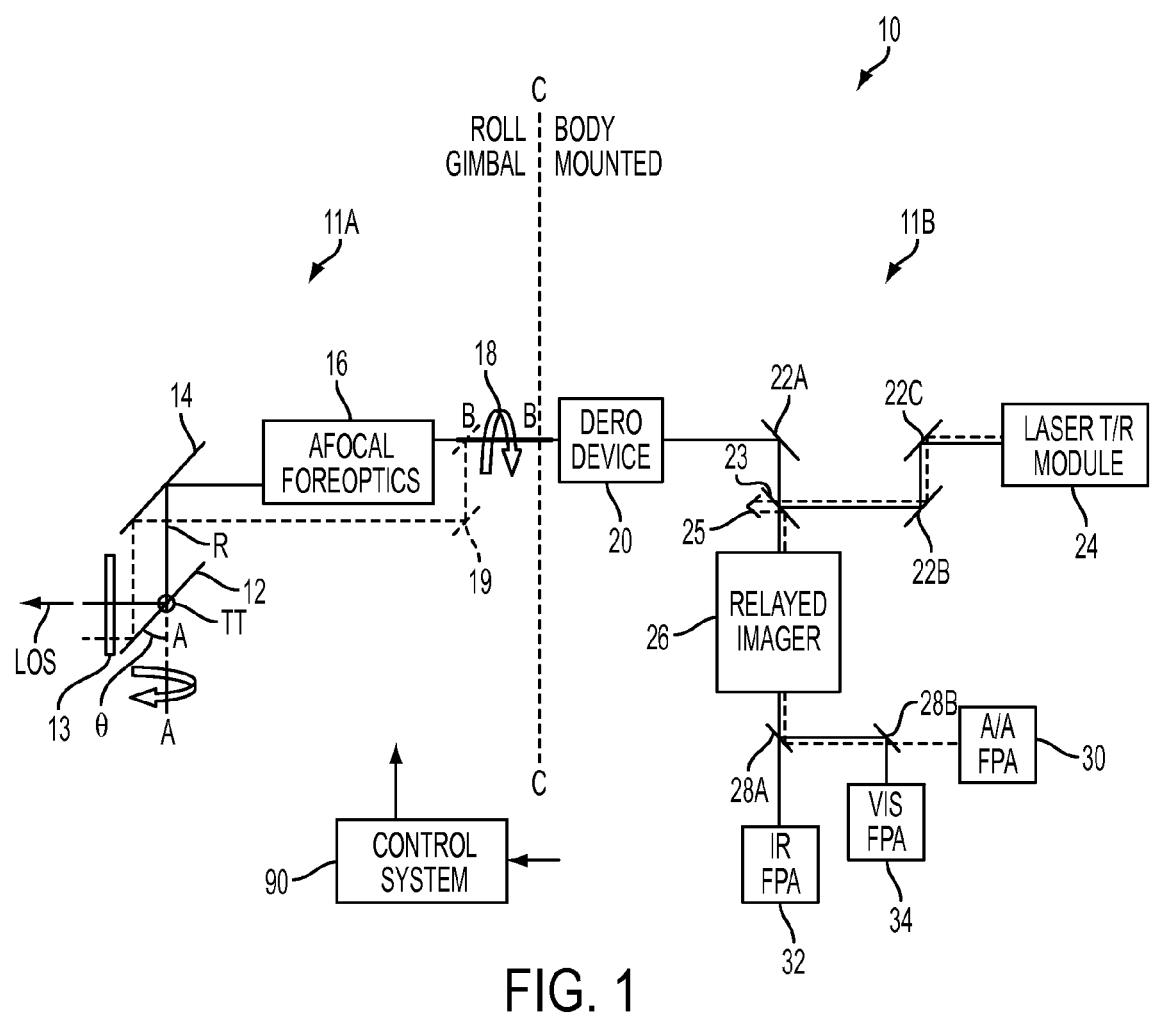
FIG. 1 depicts an optical block diagram of sensor system 10 integrating the IRST function, the standoff reconnaissance function and the targeting function, according to one embodiment.

FIG. 1 depicts an optical block diagram of sensor system 10 integrating the IRST function, the standoff reconnaissance function and the targeting function, according to one embodiment. Sensor system 10 includes elevation (EL) and azimuth (AZ) pointing mirror or coelostat mirror (hereinafter referred to as "c-mirror") 12, one or more windows 13, fold mirror 14, afocal telescope multi-mirror arrangement fore-optics 16, wide field of view (WFOV) insert mirror 18, by-pass mirror 19, derotation optical device 20, beam steering mirrors 22A, 22B, 22C, laser dichroic beam splitter (B/S) mirror 23, laser module 24, beam direction preserving device (e.g., corner cube) 25, a multi-mirror relayed imager or imaging optics 26, dichroic beam splitters (B/S) 28A and 28B, auto-alignment detector (e.g., a focal plane array) 30, infrared detector (e.g., a focal plane array) 32, and visible detector (e.g., a charge coupled device or CCD) 34.

In observation mode such as standoff reconnaissance mode or IRST mode, radiation beam from an object at far field traversing one or more windows 13 is received by c-mirror 12 which is pointed in a direction of a scene or object being observed, i.e., pointed in a line of sight direction (LOS). C-mirror 12 is configured to rotate around axis AA. Rotation axis AA is parallel to beam of radiation R as reflected by c-mirror 12. In one embodiment, rotation axis AA forms an angle θ of about 45° respective to the surface plane of c-mirror 12. Therefore, a rotation of c-mirror 12 around rotation axis AA, enables c-mirror 12 to receive radiation from a scene or object at different elevation and azimuth angles while reflecting the received radiation in generally a same direction (direction of the reflected radiation beam R). C-mirror 12 directs the received radiation beam towards fold mirror 14 which in turn directs the radiation towards either afocal fore-optics 16 or towards bypass mirror 19. In one embodiment, afocal fore-optics 16 comprises an afocal three-mirror anastigmat telescope. However, any number (e.g., two or more) of anastigmat mirrors can be used as desired. As its name indicates, afocal fore-optics mirror arrangement 16 is afocal. Therefore, a collimated radiation beam from the object or scene at far field received by afocal fore-optics 16 is output by the fore-optics 16 as a collimated radiation beam of generally smaller diameter but correspondingly larger field of view. The collimated radiation beam output by the afocal fore-optics 16 can be directed toward derotation device 20. When the radiation beam passes through afocal fore-optics 16, a relatively narrow field of view (NFOV) is achieved. In order to achieve a wider field of view (WFOV), afocal fore-optics 16 is bypassed using bypass mirror 19 and WFOV insert mirror 18.

The bypassed radiation beam is received by bypass mirror 19 which reflects the radiation beam towards WFOV insert mirror 18. WFOV insert mirror 18 in turn is arranged to reflect the radiation beam toward derotation device 20. Therefore, in the WFOV configuration, the WFOV insert mirror 18 and the bypass mirror 19 are moved away from the path of the radiation beam allowing only the radiation beam output by afocal fore-optics 16 to reach the derotation device 20. While, in the NFOV configuration, bypass mirror and WFOV mirror are positioned in the path of the radiation beam so that the radiation beam bypasses afocal foreoptics 16 to reach the derotation device 20.

A portion 11A of sensor system 10 including one or more windows 13, c-mirror 12, fold mirror 14, afocal fore-optics 16, WFOV insert mirror 18, and bypass mirror 19 are provided on a roll gimbal (shown as axis BB in FIG. 1). A portion 11B of sensor system 10 including derotation optical device 20, beam steering mirrors 22A, 22B, 22C, laser dichroic beam splitter (B/S) mirror 23, laser module 24, beam direction preserving device (e.g., corner cube or prism) 25, imager or imaging optics 26, dichroic beam splitters (B/S) 28A and 28B, auto-alignment detector (e.g., a focal plane array) 30, infrared detector (e.g., a focal plane array) 32, and visible detector (a charge coupled device or CCD) 34 are mounted on a body (not shown) such as a body of an aircraft. For example, in one embodiment, portion 11B can be mounted onto a structure that can be attached to the body. The structure can be fixed relative to the body or movable relative to the body. Line or plane CC in FIG. 1 schematically delimits the portion 11A of sensor system 10 mounted on a roll gimbal and the portion 11B of sensor system 10 mounted on the fixed body.

The roll gimbal rotates around roll axis BB generally perpendicular to rotation axis AA. Therefore, the portion 11A of sensor system 10 including one or more windows 13, c-mirror 12, fold mirror 14, afocal fore-optics 16, WFOV insert mirror 18, and bypass mirror 19 are configured to rotate around axis BB relative to fixed portion 11B of sensor system 10. Rotation axis or roll axis BB is parallel to the beam of radiation output by afocal fore-optics 16 or parallel to the beam of radiation reflected by WFOV insert mirror 18 (in the WFOV configuration). The rotation around axis BB enables pointing the c-mirror in the azimuth direction or horizontal direction to enable c-mirror 12 to receive radiation from a desired object or scene.

However, due to the rotation of portion 11A mounted on roll gimbal and thus to the rotation of c-mirror 12 around axis BB, the image from the far field object or scene is also rotated. In order to correct for the rotation of the image, derotation device 20 is configured to counter-rotate so that the image output by the derotation device is in the same direction independent of the rotation of roll gimbal around axis BB or the rotation of c-mirror around axis AA. In one embodiment, derotation device 20 is an optical prism. In another embodiment, derotation device 20 may include reflective optical elements (e.g., mirrors) and can be, for example, an all-reflective derotation device. However, as it can be appreciated other types of derotation devices can also be used. Furthermore, in one embodiment, derotation device 20 can be omitted. In this case, the derotation function can be accomplished electronically or through image data processing. In yet another embodiment, derotation 20 may not be needed. For example, while the derotation function is used for the IRST function, advanced LADAR scanning, and standoff reconnaissance, the derotation function may not be needed or may be optional for targeting functions, ranging functions and designator operation.

The radiation beam output by derotation device 20 is directed toward beam steering mirror 22A. Beam steering mirror reflects the radiation beam towards laser dichroic mirror 23. Laser dichroic mirror 23 is configured to transmit a portion of the radiation beam received from beam steering mirror 22A towards imager 26. As will be described below, laser dichroic mirror 23 is also configured to reflect a portion of the radiation beam received from beam steering mirror 22A towards beam steering mirrors 22B and 22C and into laser module 24. In one embodiment, imager 26 is a focal optical system configured to form a focal image on a detector (e.g., infrared focal plane array or IR FPA) 32 or detector (e.g., visible focal plane array or VIS FPA) 34, or both. In one embodiment, imager 26 is an anastigmat four-mirror system. However, imager 26 can have any number of mirrors (e.g., two or more mirrors) as desired. The radiation beam output by imager 26 is directed onto detector 32 or detector 34 depending on the radiation wavelength. Dichroic beam splitters (B/S) 28A and 28B are used to direct the radiation beam output by imager 26 depending upon the wavelength of the radiation towards either detector 32 or detector 34. For example, if the radiation beam has both an infrared component and a visible component, the infrared portion of the radiation can be directed towards detector 32 while the visible portion of the radiation can be directed towards detector 34.

In range finder mode, LADAR mode or targeting mode, laser module 24 is used to output a laser beam for range finder, LADAR or targeting functions. Laser module 24 outputs a beam of radiation (shown as a solid line in FIG. 1) in any desired wavelength including infrared radiation wavelength range. The laser beam output by laser module 24 is reflected by beam steering mirrors 22B and 22C and directed toward laser dichroic mirror 23. Laser dichroic mirror 23 reflects the laser beam toward derotation device 20 which transmits the laser beam toward afocal fore-optics 16. The laser beam exits afocal fore-optics 16 and is directed by fold mirror 14 towards c-mirror 12. C-mirror 12 in turn reflects the laser beam towards the intended object or target.

In one embodiment, in order to track the direction of the laser beam, the laser module is also configured to emit an auto-alignment beam (shown as a dotted line in FIG. 1) that is precisely co-aligned in direction to the laser beam. In one embodiment, the auto-alignment beam may have a different wavelength than the laser beam. In one embodiment, the auto-alignment beam may have less intensity than the laser beam. Similar to the laser beam, the auto-alignment beam is reflected by the beam steering mirrors 22B and 22C towards laser dichroic mirror 23. Laser dichroic mirror 23 is configured to transmit a portion of the auto-alignment beam when incident on one of the faces (front face) of the dichroic mirror 23. Therefore, in order to enable the laser dichroic mirror to reflect the auto-alignment beam towards imager 26 and still preserve the desired line of sight data indicative of the direction of the laser beam, a corner cube or prism 25 is used to reflect back the auto-alignment beam towards the back face of dichroic mirror 23. The back face of dichroic mirror 23 is configured to reflect a portion of the auto-alignment beam toward imager 26. Imager 26 transmits the auto-alignment beam towards beam splitter 28A which directs the auto-alignment beam towards beam splitter 28B. Beam splitter 28A is configured to reflect the auto-alignment beam and transmit the infrared radiation beam output by imager 26. Beam splitter 28B is configured to transmit the auto-alignment beam towards auto-alignment detector (e.g., auto-alignment FPA) 30 and reflect the visible radiation output by imager 26 towards detector 34. Auto-alignment detector 34 is used to detect the laser boresight direction relative to lines of sights of focal plane arrays 32 and 34.

The auto-alignment beam is used to determine the line of sight (LOS) direction of the laser, i.e., to determine the location where the laser beam is pointing to. By using the above described optical arrangement, the auto-alignment beam "follows" the laser beam regardless of the position of the beam steering mirrors 22B and 22C or laser dichroic mirror 23. In other words, the laser beam and the auto-alignment beam have a common optical path from laser module 24 through imager 26. Therefore, when the laser beam is steered using beam steering mirrors 22B and/or 22C and/or laser dichroic mirror 23, the auto-alignment is also steered in the same fashion using beam steering mirrors 22B and/or 22C and/or laser dichroic mirror 23. Indeed, as shown in FIG. 1, the auto-alignment beam (dotted line) and the laser beam (solid line) are both reflected by beam steering mirrors 22B and 22C in the same fashion and thus follow substantially the same path.

However, with respect to dichroic mirror 23, the laser beam is reflected by the front face of dichroic mirror 23 towards beam steering mirror 22A which in turn directs the laser beam towards derotation device 20 while the auto-alignment beam is transmitted through dichroic mirror 23. Therefore, in order to reflect the auto-alignment off of laser dichroic mirror 23, corner cube or prism 25 is positioned in the path of the transmitted auto-alignment beam. Corner cube or prism 25 is configured and arranged to reflect the auto-alignment beam onto the back face of laser dichroic mirror 23. The back face of laser dichroic mirror 23 is configured to reflect a portion of the auto-alignment beam towards imager 26. By reflecting the auto-alignment on the back face of dichroic mirror 23 and reflecting the laser beam on the front face of the dichroic mirror 23, a rotation of the dichroic mirror 23 will effect the orientation of both the laser beam and the auto-alignment beam. Therefore, the auto-alignment beam "tracks" the laser beam regardless of the position of beam splitters 22B, 22C and dichroic mirror 23. As a result, by determining the position of the auto-alignment beam using auto-alignment detector (e.g., A/A FPA) 20, the line of sight or boresight of the laser beam can be determined with considerable accuracy.

FIGS. 2A-2C depict a raytrace of sensor system 10, according to one embodiment. FIG. 2A is a lateral view of the ray trace of sensor system 10, FIG. 2B is front view of the ray trace of sensor system 10, and FIG. 2C is a ray trace of a bottom view of sensor system 10. Same character numerals are used in FIGS. 2A-2C as in FIG. 1 to indicate corresponding optical components. FIGS. 2A-2C shows the relative position of various optical elements of the sensor system 10 as well as the position of the roll axis BB and rotation axis AA of the c-mirror 12. For example, FIG. 2A shows the rotation axis AA perpendicular to the plane of FIG. 2A and rotation of roll axis BB substantially perpendicular to rotation axis AA within the plane of FIG. 2A. FIG. 2B shows the rotation axis AA within the plane of FIG. 2B and rotation or roll axis BB substantially perpendicular to rotation axis AA perpendicular to the plane of FIG. 2B. FIG. 2C shows the rotation axis AA within the plane of FIG. 2C and rotation or roll axis BB substantially perpendicular to rotation axis AA within the plane of FIG. 2C. It is noted, however, that the roll axis BB and rotation axis AA do not intersect each other. The roll axis BB and the rotation axis AA are separated by a distance D (shown in FIG. 2A). FIG. 2A-2C depict various optical elements including c-mirror 12, fold mirror 14 various mirrors within afocal fore-optics 16, derotation device 20, beam splitter 23 and mirrors within imager 26 are shown in perspective with their relative position. However, for the sake of clarity, laser module 24 and associated beam steering mirrors 22B and 22C, dichroic mirror 23, corner cube 25, beam splitters 28A and 28B, and detectors 30, 32 and 34 are not shown in FIGS. 2A, 2B and 2C.

FIG. 2B also depicts a cylinder swept volume as circle 40. The cylinder swept volume 40 corresponds to the volume occupied by the various optical elements of sensor system 10, i.e., the volume swept by the path of radiation beam. In one embodiment, as shown in FIG. 2B, a diameter of cylinder swept volume 40 is approximately 2.5 a diameter of the aperture represented by dotted circle 42 approximately defined by c-mirror 12. In other words, a cylinder diameter to aperture diameter ratio is about 2.5:1 which provides a sensor system with an efficient package.

In one embodiment, the rotation axis AA of c-mirror 12 is provided in close proximity to one or more windows 13. This enables to minimize the size of one or more windows 13 while providing enough space for c-mirror 12 to rotate around axis AA to scan in the elevation and azimuth directions. In one embodiment, the one or more window 13 can be provided as segmented windows in the elevation direction. In one embodiment, one or more windows 13 can be slaved to the roll gimbal in the sense that one or more windows 13 rotate around roll axis BB in response to the use of roll axis BB in covering the desired field of regard. In one embodiment, one or more windows 13 are not slaved in the elevation direction in the sense that one or more windows 13 do not rotate with rotation of c-mirror 12 around axis AA. In yet another embodiment, one or more windows 13 are not slaved in either the elevation direction or in the roll direction in the sense that one or more windows 13 do not rotate with rotation of c-mirror 12 around axis AA, nor with the roll axis BB. In this case, the one or more windows 13 can be sized so as to provide the desired field of regard in the elevation direction and/or the azimuth direction. For example, in one embodiment, window 13 can be spherical so as provide a wide field of regard in the elevation direction and/or the azimuth direction.

In one embodiment, a shortest possible coude path off of gimbal can be achieved. As can be appreciated from FIG. 1 and FIGS. 2A-2C, the coude path corresponds to the path between the output of fore-optics 16 or from WFOV insert mirror 18 to derotation device 20. In one embodiment, the length of the coude path is one-half the size or diameter of the aperture. However, the coude path can be less or equal to approximately one-half the size or diameter of the aperture defined by the size or diameter of c-mirror 12. By providing the shortest possible coude path by minimizing the length of the coude path, jitter errors and/or line of sight (LOS) errors can be minimized. Furthermore, by using a shortest possible path off gimbal, three to four times wider field of view in the NFOV configuration can be achieved. This short coude path is in dramatic contrast to conventional and known coude paths that are: a) much longer in total path length, b) may contain 3-5 extra flat fold mirrors for beam re-direction within that long path length, c) pass the optical beam through both an elevation and azimuth bearing aperture, which greatly limits the field of view that can be passed along the path, and d) allow numerous potential sources of line of sight and path length variations because of the long total path length and the need for three to five additional flat fold mirrors.

As shown FIGS. 2A-2B, two all-reflective optical assemblies are used in sensor system 10: afocal foreoptics 16 and imager 26. By using all-reflective optical assemblies for fore-optics 16 and imager 26, chromatic aberrations or restrictions can be minimized or mitigated. Also, by providing all-reflective optical assemblies, common optical path can be provided for all passive function and active functions thus achieving desired boresight characteristics for both functions. In addition, by using all reflective optical assemblies, first order thermal sensitivity can be minimized.

FIGS. 3A-3C show a ray trace of sensor system 10 where c-mirror 12 is rotated around rotation axis AA to produce a wide field of regard travel in the elevation direction to locate, track or identify a scene or an object in the elevation direction, as desired in a targeting mode, according to one embodiment. The same character numerals are used in FIGS. 3A-3B as in FIG. 1 and FIGS. 2A-2C to indicate corresponding optical components. For clarity purposes some components shown in FIG. 1 are omitted in FIGS. 3A-3C. For example, laser module 24 and associated beam steering mirrors 22B and 22C as well as 28A and 28B and detectors 30, 32 and 34 are not shown in FIGS. 3A-3C. As shown in FIG. 3A, c-mirror 12 is oriented at an angle about nadir direction to stare or scan in a generally forward-downward line of sight (LOS) direction. As shown in FIG. 3B, c-mirror 12 is oriented generally at a nadir direction to stare or scan in a generally downward LOS direction. As shown in FIG. 3C, c-mirror 12 is oriented at an angle about nadir direction to stare or scan in a generally backward-downward LOS direction. These three examples demonstrate the ability of sensor system 10 to scan or stare scan in a wide range of elevation angles. For example, when considering the forward direction (indicated generally by arrow 100) as a reference direction equal to 0 deg., the range of elevation angles can between about +15 deg. and about −150 deg. Therefore, a field of regard greater than about 165 deg. can be achieved in the elevation direction. In one embodiment, as shown in FIGS. 3A-3C, the arrow 100 indicates generally the forward direction is parallel to the roll axis BB.

Figures 4A, 4B, 4C:
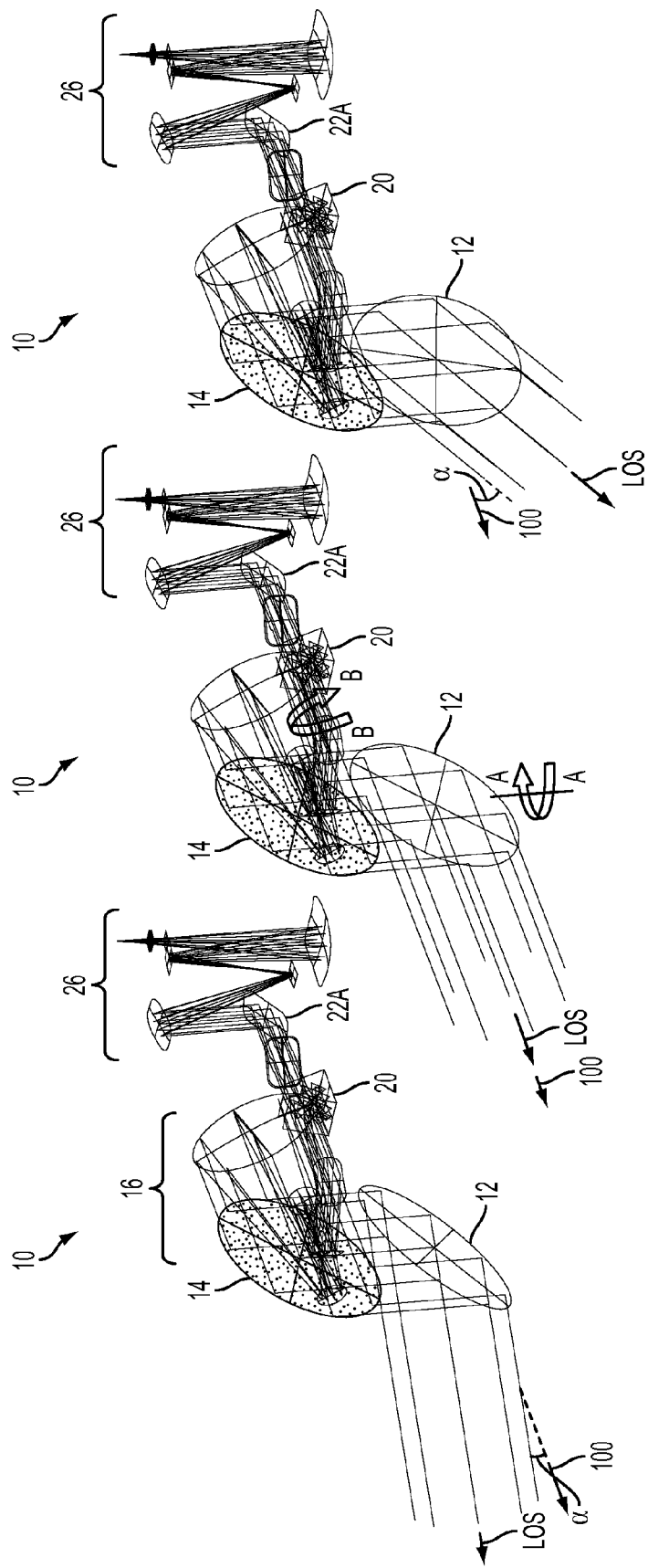
FIGS. 4A-4C show a ray trace of the sensor system where coelostat mirror is rotated around rotation axis AA and a roll gimbal in the sensor system including the coelostat mirror is rotated around roll axis BB to produce a wide field of regard travel in the azimuth direction to locate, track or identify a scene or an object in the azimuth direction, as desired in an IRST mode, according to one embodiment.

FIGS. 4A-4C show a ray trace of sensor system 10 where c-mirror 12 is rotated around rotation axis AA and roll gimbal including c-mirror 12 is rotated around roll axis BB to produce a travel in the azimuth direction to locate, track or identify a scene or an object in the azimuth direction, as desired in an IRST mode, according to one embodiment. Same character numerals are used in FIGS. 4A-4B as in FIG. 1, FIGS. 2A-2C and FIGS. 3A-3C to indicate corresponding optical components. For clarity purposes some components shows in FIG. 1 are omitted in FIGS. 4A-4C. For example, laser module 24 and associated beam steering mirrors 22B and 22C as well as 28A and 28B and detectors 30, 32 and 34 are not shown in FIGS. 4A-4C. As shown in FIG. 4A, c-mirror 12 is oriented at an angle to stare or scan in a generally forward-left LOS direction. As shown in FIG. 4B, c-mirror 12 is oriented to stare or scan in a generally forward-straight LOS direction. As shown in FIG. 4C, c-mirror 12 is oriented at an angle to stare or scan in a generally forward-right LOS direction. These three examples demonstrate the ability of sensor system 10 to scan or stare objects or scenes in a wide range of azimuth angles. For example, when considering the forward direction (indicated generally by arrow 100) as a reference direction equal to 0 deg., the range of elevation angles can between about ±180 deg., i.e., approximately a full 360 deg. Therefore, a field of regard greater than about 140 deg. can be achieved in the azimuth direction. In one embodiment, this configuration can be used for example for IRST function.

Figures 5A, 5B, 5C:
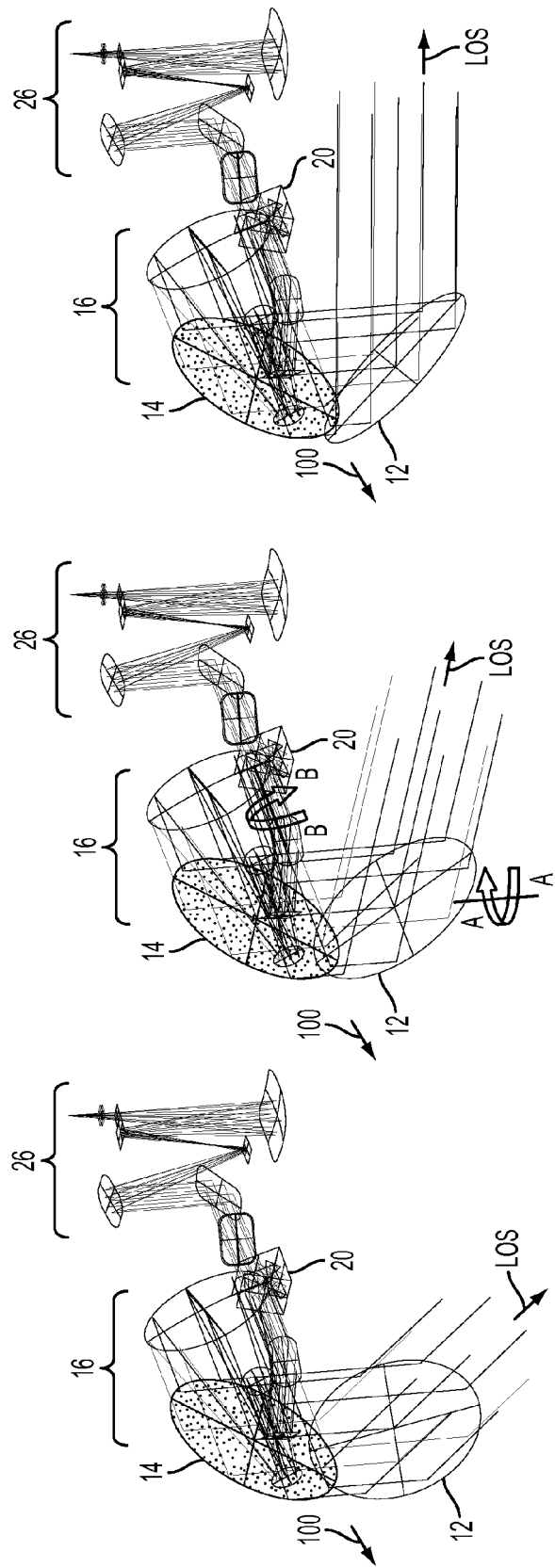
FIGS. 5A-5C show a ray trace of the sensor system where the coelostat mirror is rotated around rotation axis AA and the roll gimbal including coelostat mirror 12 is rotated around roll axis BB to produce a wide field of regard pitch travel in the side direction to locate, track or identify a scene or an object, as desired in a standoff reconnaissance mode, according to one embodiment.

FIGS. 5A-5C show a ray trace of sensor system 10 where c-mirror 12 is rotated around rotation axis AA and the roll gimbal including c-mirror 12 is rotated around roll axis BB to produce a pitch travel in the sideways direction to locate, track or identify a scene or an object, as desired in a standoff reconnaissance mode, according to one embodiment. Same character numerals are used in FIGS. 5A-5B as in FIG. 1, FIGS. 2A-2C, FIGS. 3A-3C and FIGS. 4A-4B to indicate corresponding optical components. For clarity purposes some components shown in FIG. 1 are omitted in FIGS. 5A-5C. For example, laser module 24 and associated beam steering mirrors 22B and 22C as well as 28A and 28B and detectors 30, 32 and 34 are not shown in FIGS. 5A-5C. As shown in FIG. 5A, c-mirror 12 is oriented at an angle to stare or scan in a generally left-downward LOS direction. As shown in FIG. 5B, c-mirror 12 is oriented to stare or scan in a generally left-backward LOS direction. As shown in FIG. 5C, c-mirror 12 is oriented at an angle to stare or scan in a generally a further left-backward LOS direction. These three examples demonstrate the ability of sensor system 10 to scan or stare objects or scenes in a wide range of pitch angles. In one embodiment, this configuration can be used for example for stand-off reconnaissance. Although, c-mirror 12 is shown staring generally in the left direction, Figures similar to FIGS. 5A-5C can also be provided to show c-mirror 12 staring towards the right direction relative to pointing arrow 100. A field of regard of greater than about 75 deg. can be achieved in the pitch direction (side staring or scanning).

In one embodiment, whenever the orientation of c-mirror 12 is such that the sensor line-of-sight direction (LOS) is precisely parallel to roll axis BB, for example as shown in FIG. 4B or as shown schematically in FIG. 1, a rotation of the gimbal or portion 11A of optical system 10 around roll axis BB would not change the LOS direction. On the other hand, when c-mirror 12 is oriented such that the LOS direction is at a certain angle α relative to roll axis BB (α is the angle between roll axis BB and LOS direction), for example as shown in FIGS. 3A-3C, 4A, 4C, 5A-5C (e.g., α equal to about 45 deg., about 60 deg., or about 90 deg.), a rotation of the gimbal or portion 11A of optical system 10 around roll axis BB causes the LOS direction to sweep out a cone centered about roll axis BB (e.g., with an angular diameter equal to about 2×45 deg., about 2×60, or about 2×90). The situation where the LOS is precisely parallel to roll axis BB and thus causing the roll axis BB to not steer the LOS is called a "gimbal singularity" or "gimbal lock." A control gain of roll axis BB is proportional to $1/\sin \alpha$. Hence, the gain of roll axis BB can go to infinity when α is equal to 0, i.e., when the LOS is precisely parallel to roll axis BB. From the standpoint of an automated control system 90 (shown in FIG. 1) for controlling the orientation of c-mirror 12, i.e., controlling the rotation around roll axis BB and rotation around axis AA, this gimbal singularity may be problematic because no amount of rotation around roll axis BB produces any desired effect of steering the LOS.

As a result, in certain applications, the gimbal singularity is to be avoided. However, in an embodiment, where the gimbal singularity cannot be avoided, for example because the gimbal singularity is within the desired field of regard (FOR), then it may be desirable to provide a third gimbal axis TT (shown in FIG. 1). In one embodiment, third gimbal axis TT is within the plane of c-mirror 12 and is perpendicular to rotation axis AA. In one embodiment, the third gimbal axis TT resides on rotation axis AA of c-mirror 12 in that a rotation of c-mirror 12 around axis AA produces a rotation of axis TT. The third gimbal axis TT can be of small angular travel (for example, less than or equal to 5 deg.). As a result, axis TT travels around roll axis BB and avoids the gimbal singularity.

For example, when an object being continuously tracked by moving c-mirror 12 in various directions by rotating around rotation axis AA and/or around roll axis BB and/or optional third axis TT using control system 90 is projected to go close to or through the gimbal singularity, and optional third gimbal axis TT is provided with a range of angles α, for example, ±3 deg, roll axis BB is no longer used for tracking the object within the ±3 deg. range that surrounds the gimbal singularity. Instead, rotation axis AA and third gimbal axis TT are used to continue to track the object within the ±3 deg. angular range. When, on the other hand, the object location exceeds, for example, the 3 deg. singularity, roll axis BB is used by control system 90 in the tracking motion. In this case, the third axis can be gradually returned to 0 deg. and no longer has involvement in the tracking motion. In other words, control system 90 controls the tracking by rotating c-mirror 12 around third gimbal axis TT when an object is located closely around the singularity (e.g., within the ±3 deg. range). Otherwise, when the object is outside the ±3 deg. range around the singularity, control system 90 controls the tracking by rotating roll axis BB and leaving the third axis TT fixed or returning third axis TT to 0 deg.

As it can be appreciated from the above paragraphs, in some embodiments, rotation axis AA of c-mirror 12 and roll axis BB are generally the only two axes that are involved in tracking an object. However, within for example the 3 deg. range of the singularity, it is c-mirror rotation axis AA and third gimbal axis TT that are used. In one embodiment, for example, within the ±3 deg. angular range, roll axis BB gain can be greater than about 19, for instance. When roll axis BB gain is greater than for example about 19, roll axis BB is not used by control system 90 to orient or direct c-mirror 12. If a narrower angular range (e.g., ±2 deg.) is selected for third axis TT to encompass the singularity, the gain for roll axis BB can increase to about 28. Therefore, the angular range for third axis TT can be tailored so as to prevent a high gain for roll axis BB.

It is worth noting that the sensor system 10 described herein is capable of providing IRST, targeting, and standoff reconnaissance sensing functions utilizing either linear 1-D detector arrays operating in a scanning mode, or 2-D (e.g., square, rectangular or circular) detector arrays operating in either staring or step-staring modes, or in any combination of these modes. For example, IRST type sensing can equally well be accomplished by either scanning a linear array or step-staring a square/rectangular array. In one embodiment, target sensing can be performed preferably by staring with a square/rectangular array because of the continuous coverage on the target, but target sensing can also be performed by scanning a linear array. Standoff reconnaissance can equally well be accomplished by either scanning a linear array or step-staring a square/rectangular array. All particular hardware features and functions that are needed for these three modes (scanning, staring, and step-staring) are provided by the sensor system described herein.

Scanning with a linear 1-D array may require a smooth continuous motion of the line of sight (LOS) that is strictly maintained orthogonal to the long dimension of the linear array. This can be accomplished by a coordinated operation of elevation axis TT, c-mirror axis AA, roll axis BB, derotation device 20, and beam steering mirror 22A, for example, using control system 90. Staring with a square/rectangular 2-D array, particularly during target tracking, may also require stable and smooth motion of the line of sight (LOS) that matches that of the target and may optionally require that a certain detector orientation be preserved. This can also be accomplished by coordinated operation of the elevation axis TT, c-mirror axis AA, roll axis BB, derotation device 20, and beam steering mirror 22A, for example, by using control system 90. Step-staring a square/rectangular 2-D detector array is slightly more complex when this mode is used for wide area search functions in IRST or stand-off reconnaissance sensing. Indeed, continuous and smooth motions of elevation axis TT, c-mirror axis AA, roll axis BB, derotation device 20 may cause motion of the 2-D array orthogonal to one of its sides. However, the array line of sight should be fixed and still in inertial space during the frame integration time of each exposure, typically measured in milliseconds. Motion of beam steering mirror 22A can be used to momentarily cancel the scanning effects of motion of elevation axis TT, c-mirror axis AA, roll axis BB, and derotation device 20, for a small angle (measured in milliradians) and a relatively short period of time (e.g., few milliseconds). This operation of beam steering mirror 22A is commonly termed "back-scan", and the direction of the back-scan is held in constant orientation to the detector arrays because beam steering mirror 22A is between derotation device 20 and passive radiation detectors (e.g., FPAs) 32 and 34. For certain applications where the continuous scan motion is very fast, and the frame integration time is relatively long, the back-scan angle can be somewhat large (e.g., many milliradians). For such situations, it may be advantageous to have two beam steering mirrors instead of a single mirror at the location of beam steering mirror 22A. This is easily accommodated within the sensor system, and the operation of two beam steering mirrors can be used to decrease or eliminate beam walk or wander on the fore-optics primary mirror. This use of two beam steering mirrors for the elimination of beam wander on the fore-optics primary mirror is precisely what is accomplished in the active laser path by the operation of beam steering mirrors 22B and 22C.

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. A sensor system comprising:
   a first optical sub-system comprising a first plurality of optical elements; and
   a second optical sub-system comprising a second plurality of optical elements including a first mirror and an afocal fore-optics configured to receive radiation from the first mirror and to transmit the radiation towards the first optical sub-system, the second optical sub-system configured to rotate about a first axis relative to the first optical sub-system and the first mirror configured to rotate about a second axis substantially perpendicular to the first axis;
   wherein the first axis and the second axis are arranged so as not to intersect each other so as to maximize a field of regard of the sensor system, and wherein the first axis is substantially parallel to a radiation beam output by the afocal fore-optics.

2. The system of claim 1, further comprising a window, wherein the first axis and the second axis are arranged so as not to intersect each other so as to reduce a size of the window.

3. The system of claim 2, wherein the window is part of the second optical sub-system.

4. The system of claim 2, wherein the window is part of the first optical sub-system.

5. The system of claim 1, wherein the first optical sub-system is mounted to a body.

6. The system of claim 5, wherein the body is a body of an aircraft.

7. The system of claim 1, wherein the first mirror is a coelostat mirror, wherein the second axis forms an angle of approximately 45 deg. relative to the plane of the coelostat mirror and the second axis is parallel to a beam of radiation reflected by the coelostat mirror.

8. The system of claim 1, wherein the second plurality of optical elements includes a fold mirror configured to reflect radiation received from the first mirror towards the afocal fore-optics.

9. The system of claim 1, wherein the second plurality of optical elements comprises a bypass mirror and a wide field-of-view insert mirror configured and arranged to be movable so that radiation from the first mirror bypasses the afocal fore-optics.

10. The system of claim 9, wherein when radiation passes through the afocal fore-optics a relatively narrow field of view is achieved and when the afocal fore-optics is bypassed using the bypass mirror and wide field of view insert mirror a wider field of view is achieved.

11. The system of claim 1, wherein a coude path between the second optical sub-system and the first optical sub-system is less than or equal to approximately half an aperture size defined by a size of the first mirror so as to reduce jitter errors or line of sight errors, or both.

12. The system of claim 1, wherein a ratio of cylinder diameter swept volume size of the second optical sub-system to aperture size of the system is about 2.5:1.

13. The system of claim 1, wherein a rotation of the first mirror about the second axis provides a travel of the field of regard in an elevation direction.

14. The system of claim 13, wherein the field of regard of the optical system in the elevation direction is greater than approximately 165 deg.

15. The system of claim 1, wherein a rotation of the second optical sub-system around the first axis provides a travel of the field of regard in an azimuth direction.

16. The system of claim 15, wherein the field of regard of the sensor system in the azimuth direction is greater than approximately 140 deg.

17. The system of claim 1, wherein the field of regard of the sensor system in a pitch direction is greater than approximately 75 deg.

18. The system of claim 1, wherein the first mirror is further configured to rotate around a third axis substantially perpendicular to the second axis and in a plane of the mirror, wherein a rotation of the first mirror around the third axis prevents a gimbal singularity in which a line of sight direction substantially coincides with the first axis.

19. The system of claim 1, further comprises a control system configured to control an orientation of the first mirror to capture radiation from a far field object or scene.

20. The system of claim 19, wherein the control system is configured to control a tracking of the object or scene by rotating the first mirror about a third axis substantially perpendicular to the second axis when the object or scene is located around a gimbal singularity in which a line of sight direction of the object or scene is within a range of angles that surround the first axis, and not rotating the second optical sub-system about the first axis.

21. The system of claim 20, wherein the range of angles is between approximately −3 deg. and approximately +3 deg. relative to the first axis.

22. A sensor system comprising:
a first optical sub-system comprising a first plurality of optical elements; and
a second optical sub-system comprising a second plurality of optical elements including a first mirror and an afocal fore-optics configured to receive radiation from the first mirror and to transmit the radiation towards the first optical sub-system, the second optical sub-system configured to rotate about a first axis relative to the first optical sub-system and the first mirror configured to rotate about a second axis substantially perpendicular to the first axis;
wherein the first axis and the second axis are arranged so as not to intersect each other so as to maximize a field of regard of the sensor system; and
wherein the afocal fore-optics comprises two or more anastigmat mirrors.

23. The system of claim 22, wherein the first axis is substantially parallel to a radiation beam output by the afocal fore-optics.

24. The system of claim 22, wherein the second plurality of optical elements comprises a bypass mirror and a wide field-of-view insert mirror configured and arranged to be movable so that radiation from the first mirror bypasses the afocal fore-optics.

25. The system of claim 24, wherein when radiation passes through the afocal fore-optics a relatively narrow field of view is achieved and when the afocal fore-optics is bypassed using the bypass mirror and wide field of view insert mirror a wider field of view is achieved.

26. A sensor system comprising:
a first optical sub-system comprising a first plurality of optical elements; and
a second optical sub-system comprising a second plurality of optical elements including a first mirror, the second optical sub-system configured to rotate about a first axis relative to the first optical sub-system and the first mirror configured to rotate about a second axis substantially perpendicular to the first axis;
wherein the first axis and the second axis are arranged so as not to intersect each other so as to maximize a field of regard of the sensor system; and
wherein the first plurality of optical elements comprises an optical imager and a detector, the optical imager being configured to receive radiation from the second optical sub-system and to relay the radiation to the detector.

27. The system of claim 26, wherein the first plurality of optical elements comprises a derotation device configured to receive radiation from the second optical system and to transmit the radiation towards the optical imager, the derotation device being configured to counter-rotate a beam of radiation so that an image output by the derotation device is in a same direction independent of a rotation of the first mirror.

28. The system of claim 26, wherein the first optical sub-system further comprises a laser module configured to emit a laser beam and an auto-alignment beam, the laser beam being directed towards the first mirror.

29. The system of claim 28, wherein the first optical sub-system further includes a laser dichroic mirror and a beam direction device, the laser dichroic mirror being configured and arranged to reflect the laser beam and transmit at least a portion of the auto-alignment beam when the alignment beam is incident on a first face of the laser dichroic mirror and to reflect at least a portion of the auto-alignment beam when the alignment beam is incident on a second face opposite the first face, wherein the beam direction device is configured to direct at least a portion of the auto-alignment beam towards the second face of the laser dichroic mirror.

30. The system of claim 29, wherein the second face of the laser dichroic mirror is configured to reflect at least a portion of the auto-alignment beam towards the optical imager and the optical imager is configured to transmit at least a portion of the auto-alignment beam towards an auto-alignment detector.

31. The system of claim 30, wherein the auto-alignment beam is used to determine a line of sight of the laser beam.

32. The system of claim 30, wherein the laser dichroic mirror and the beam direction device are configured so that the auto-alignment beam follows a path of the laser beam.

33. The system of claim 26, wherein the first plurality of optical elements further comprises a first beam steering mirror, wherein the beam steering mirror is configured to be rotated so as to cancel a scanning motion of a line of sight of an object or scene by a continuous rotation of the first mirror during a time period corresponding to an exposure time on the detector.

34. The system of claim 33, wherein the detector is a linear one-dimensional focal plane array.

35. The system of claim 33, wherein the detector is a two-dimensional focal plane array.

36. The system of claim 33, wherein the first plurality of optical elements further comprises a second beam steering mirror and the second plurality of optical elements further comprises an afocal fore-optics, wherein the first beam steering mirror and the second beam steering mirror are configured to substantially eliminate beam walk within a primary mirror of the afocal fore-optics.

* * * * *